(12) United States Patent
Kobierecki et al.

(10) Patent No.: US 11,708,146 B2
(45) Date of Patent: Jul. 25, 2023

(54) MULTISPAR LIFTING SURFACE

(71) Applicant: Airbus Operations S.L.U., Getafe (ES)

(72) Inventors: Robert Kobierecki, Getafe (ES); Alberto Balsa-Gonzalez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 0 days.

(21) Appl. No.: 17/534,025

(22) Filed: Nov. 23, 2021

(65) Prior Publication Data
US 2022/0161921 A1 May 26, 2022

(30) Foreign Application Priority Data
Nov. 25, 2020 (EP) ..................................... 20383026

(51) Int. Cl.
*B64C 3/18* (2006.01)
*B64C 3/20* (2006.01)
*B64C 9/02* (2006.01)

(52) U.S. Cl.
CPC ................ *B64C 3/185* (2013.01); *B64C 3/20* (2013.01); *B64C 9/02* (2013.01)

(58) Field of Classification Search
CPC .... B64C 9/02; B64C 9/16; B64C 9/18; B64C 9/20
See application file for complete search history.

(56) References Cited

U.S. PATENT DOCUMENTS

| 7,806,367 | B2 | 10/2010 | Munoz Lopez et al. |
| 2009/0218446 | A1* | 9/2009 | McAlinden ............... B64C 9/02 244/131 |
| 2011/0073712 | A1 | 3/2011 | Andreani |
| 2016/0340022 | A1* | 11/2016 | Garcia Nieto ............ B64C 3/26 |

FOREIGN PATENT DOCUMENTS

| EP | 3095691 A1 | 11/2016 |
| WO | 2008132251 A1 | 11/2008 |
| WO | 2009130025 A1 | 10/2009 |

OTHER PUBLICATIONS

European Search Report; priority document.

* cited by examiner

*Primary Examiner* — Timothy D Collins
*Assistant Examiner* — Eric Acosta

(57) ABSTRACT

A multispar lifting surface including a multispar torsion box having corner reinforcements, a movable control surface, and an axial rod fitting. The movable control surface includes a movable element, a hinged connection joined to the movable element, and an axial rod joining the hinged connection to the rear spar of the multispar torsion box. The axial rod fitting is configured to join the axial rod and the multispar torsion box; and includes a longitudinal profile resting against the rear spar, and a lug joined to the longitudinal profile at one end and to the axial rod at another end; the lug defining a plane including the longitudinal axis of the axial rod. This multispar lifting surface is able to support sideward forces without any additional structure.

10 Claims, 7 Drawing Sheets

MULTISPAR LIFTING SURFACE

CROSS-REFERENCES TO RELATED APPLICATIONS

This application claims the benefit of the European patent application No. 20383026.0 filed on Nov. 25, 2020, the entire disclosures of which are incorporated herein by way of reference.

FIELD OF THE INVENTION

The present invention relates to a multispar lifting surface. Specifically, it relates to a multispar lifting surface comprising a fitting assembly for transferring axial loads from a movable control surface to the multispar torsion box of any multispar lifting surface, without the need for additional internal structures.

BACKGROUND OF THE INVENTION

Any movable control surface is installed with hinge arms that receive loads from the control surface and transfer them to the torsion box.

According to the Certification Specifications for Large Airplanes, control surfaces and their supporting hinge brackets must be designed to withstand inertia loads acting parallel to the hinge line.

A typical solution to withstand inertia loads acting parallel to the hinge line is to install a diagonal bar spanning from the control surface to a fixed structure of the torsion box. This diagonal bar reacts to all loads out of hinge arm plane, avoiding reinforced hinge arm ribs to withstand sideward forces.

The diagonal bar, or axial rod, transmits sideward loads to a fixing point fitting installed in the rear spar of the torsion box that transfers the load to the fixed structure.

The structure of a conventional torsion box includes ribs, spars, stringers and covers. In this configuration, the component "Y" of the load transferred by the axial rod (7) is received by a rear spar (2.2), while the component "X" is received by a rib (2.1). This is shown in FIG. 2. To the correct load introduction into the structure, it is necessary to install counter fittings (2.3) inside the torsion box (2).

A multispar torsion box structure of composite material is known from document WO 2008/132251. This structure comprises at least the following structural elements: lower surface, upper surface, and several spars.

A known multispar torsion box comprises closed cells, formed by individual confronted (usually C-shaped) elements arranged together to form the same. The web of each element forms a portion of a spar, and each wing of them forms a portion of the upper or lower surfaces. Each of the formed cells assume several structural functions, which when joined, give rise to the desired complete configuration.

In case of the multispar torsion box structure, there are not ribs inside the torsion box that could receive the "X" component of the axial rod load.

Thus, to make use of the same solution than in a conventional torsion box, it should be necessary to reinforce locally the joining point of the axial rod, for instance, by locating an element inside a closed cell to transfer the load to the skin and to the next spar.

But the installation of any element inside the multispar structure is difficult because as the cells are closed, and they have very limited access to the interior of the torsion box. It can only be accessed by the root and tip ends, and by the access holes. Alternatively, a cut in the closed cell structure can be made. But the cutting weakens the cell, increasing assembly operations and therefore cost and weight. In summary, this leads to a loss of the benefits of the multispar structure.

SUMMARY OF THE INVENTION

The purpose of this invention is a lifting structure comprising a system suitable to be installed in a multispar torsion box configuration to support sideward forces without any additional structure inside the closed cells of the torsion box.

As previously pointed out, in a multispar torsion box configuration there are no ribs. The multispar torsion box comprises upper and lower surfaces of composite material, and a plurality of spars arranged between the surfaces to form a multi-cell structure with the cells extending spanwise at the torsion box.

According to the above, the multispar lifting surface object of the invention comprises:

a multispar torsion box made of composite material, and comprising upper and lower surfaces and a plurality of spars between the surfaces forming a multi-cell structure, the plurality of spars including a rear spar defining:

an open cell, open towards the rear end of the torsion box, and formed by a portion of the upper surface, a portion of the lower surface, and the rear spar, and a closed cell, adjacent to the open cell, and formed by the upper surface, the lower surface, the rear spar and a further spar adjacent to the rear spar, a movable control surface comprising:

a movable element, a hinge element comprising a hinged connection joined to the movable element, and an upper and a lower arm, both arms comprising a first end located in the hinged connection and a second end located in the rear spar along to a transverse direction of the rear spar, the second end of the upper arm located in the corner of the open cell formed by the upper surface and the rear spar, and the second end of the lower arm located in the corner of the open cell formed by the lower surface and the rear spar, an axial rod comprising a first end located in the hinged connection and a second end located in the rear spar, longitudinally distant from the second ends of the upper and lower arms.

According to the invention, the multispar torsion box further comprises corner reinforcements formed by an increased thickness, at least in:

the corners of the open cell formed by the upper and lower surfaces and the rear spar, and the corners of the closed cell formed by the upper and lower surfaces and the rear spar.

Further, the multispar lifting surface of the invention comprises an axial rod fitting configured to join the axial rod and the multispar torsion box, the axial rod fitting comprising:

a longitudinal profile comprising a L-shaped cross-section, the longitudinal profile comprising two wings, one of the wings resting against a portion of one of the surfaces of the open cell and the other wing resting against a portion of the rear spar of the open cell, such that the longitudinal profile is located along the longitudinal direction of the rear spar at the corner with one of the surfaces, and a lug joined to the longitudinal profile at one end and to the axial rod at another end, the lug defining a plane comprising the longitudinal axis of the axial rod.

Thus, the load of the axial rod is correctly transferred into the fixed structure. It is firstly received by the lug aligned with the longitudinal axis of the axial rod, and transferred to the wings of the longitudinal profile resting on the cover and on the rear spar.

Additionally, the multispar structure comprises and is provided with spar corners reinforcement. This means that all spar and skin corners are hard points and it is not necessary to include any kind of fitting. These corner reinforcements have enough thickness to withstand inertial sideward loads.

Therefore, in the claimed multispar lifting surface, both components of the load transferred by the axial rod are well received.

The advantages of the present invention are the following:
Weight reduction.
Cost reduction.
Reduction of parts number.
Reduction of assembly operations and tooling.
Design simplification.

It is also an object of the present invention to provide an aircraft comprising a lifting structure according to the above.

BRIEF DESCRIPTION OF THE FIGURES

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
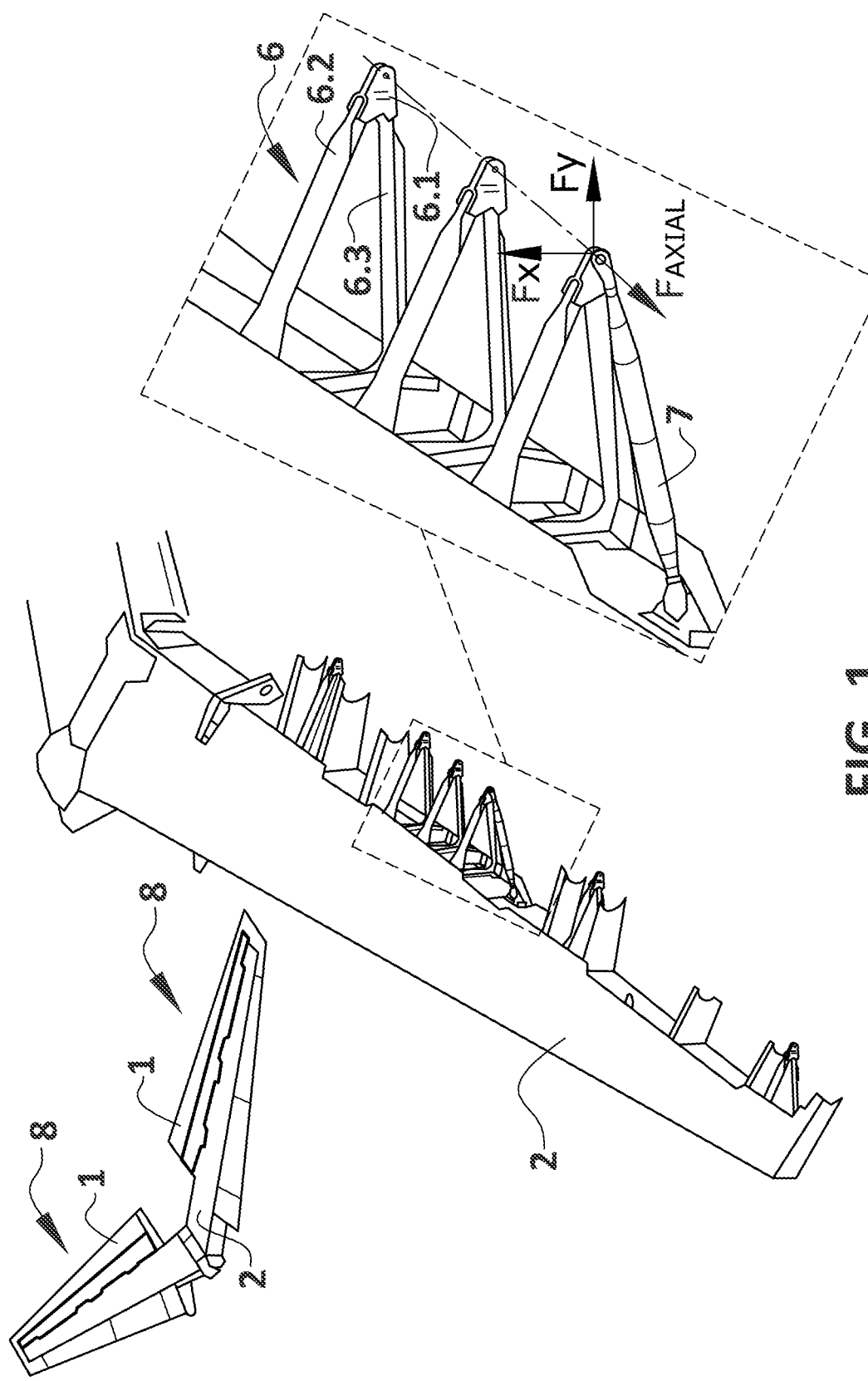
FIG. 1 shows exploded perspective views of a lifting surface, a torsion box, and a movable control surface of the state of the art.

FIG. 1 discloses a state of the art lifting surface (8) having a torsion box (2), a movable control surface, a hinge element (6), and an axial rod (7).

As mentioned, the conventional torsion box (2) includes ribs, spars, stringers and covers.

The movable control surface is installed with upper and lower arms (6.2, 6.3) to receive loads from the movable control surface. The movable control surface is located adjacent to the rear end of the torsion box (2) and comprises:
a movable element (1),
a hinge element (6) comprising a hinged connection (6.1) joined to the movable element (1), and an upper (6.2) and a lower arm (6.3), both arms (6.2, 6.3) comprising a first end located in the hinged connection (6.1) and a second end located in the rear spar (5) along to a transverse direction of the rear spar (5), the second end of the upper arm (6.2) located in the corner formed by the upper cover (4) and the rear spar (5), and the second end of the lower arm (6.3) located in the corner formed by the lower cover (3) and the rear spar (5), a plane comprising the upper and the lower arms (6.2, 6.3) being approximately perpendicular to the longitudinal direction of the rear spar (5),
an axial rod (7) comprising a first end located in the hinged connection (6.1) and a second end located in the rear spar (5), longitudinally distant from the second ends of the upper and lower arms (6.2, 6.3).

In the shown embodiment, the hinge element (6) further comprises a rear arm (6.4) connected to the first arm (6.2) and to the second arm (6.3) and resting against the rear spar (5) in the first location along the longitudinal direction of the rear spar (5).

As previously stated, the axial rod (7) is a diagonal bar spanning from the movable control surface to the fixed structure of the torsion box (2), specifically to the rear spar (5).

Figure 2:
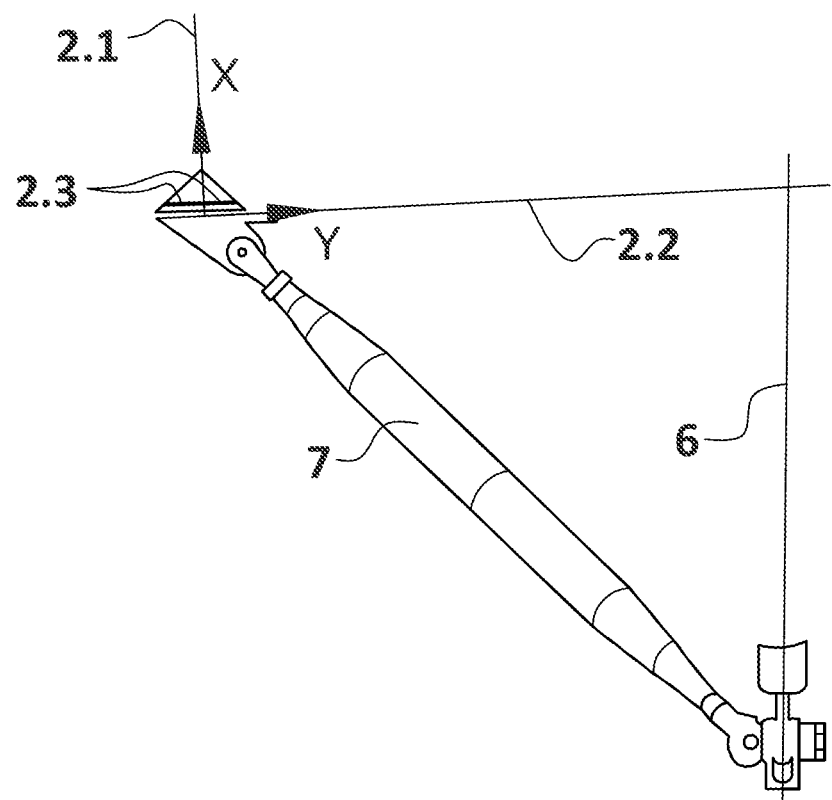
FIG. 2 shows a plan view of an axial rod joined to the rear spar of a torsion box and to the hinge arm of a movable control surface of the state of the art.

FIG. 2 shows the axial rod (7) joined to the conventional torsion box (2). The component "Y" of the load transferred by the axial rod (7) is received by the rear spar (2.2) and the component "X" by a rib (2.1) as depicted in FIG. 2. As mentioned, counter fittings (2.3) have to be installed inside the torsion box (2) for the correct load introduction into this structure.

Figure 3A:
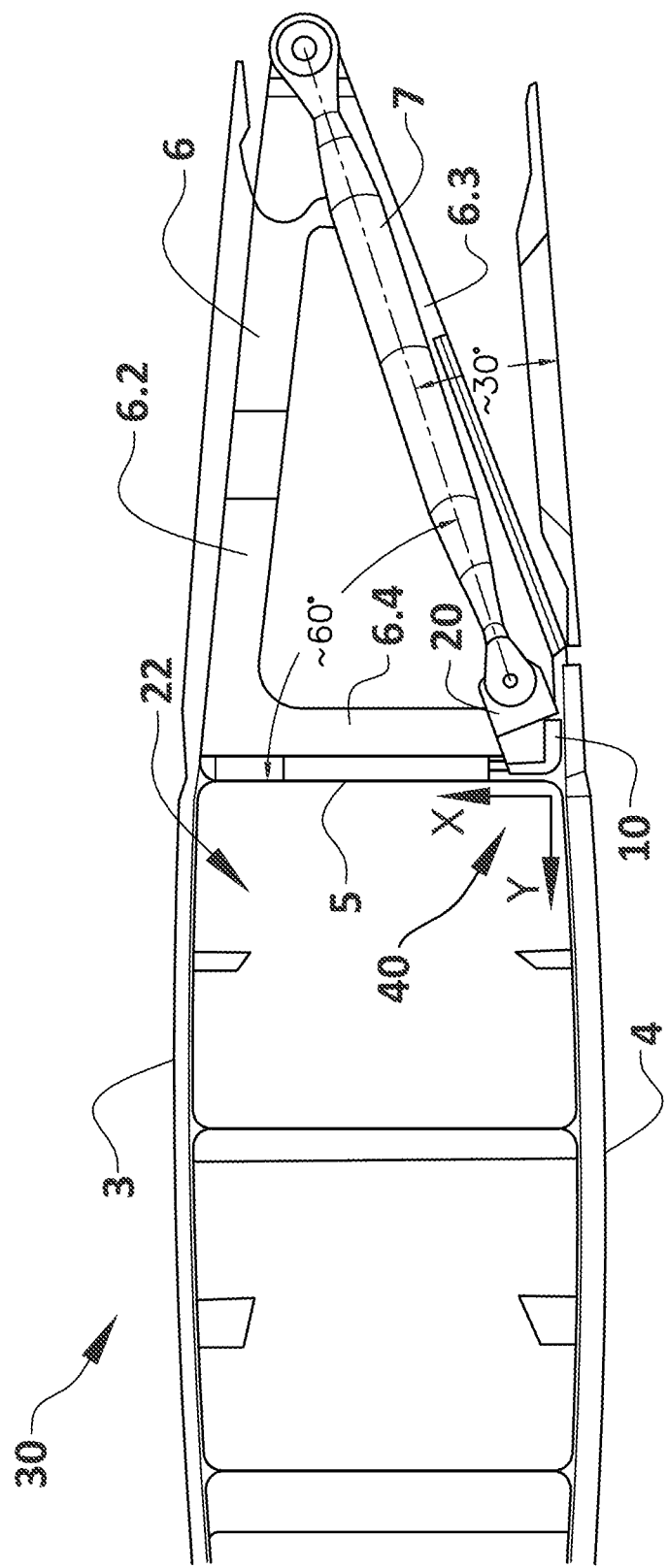
FIG. 3A shows a cross-section view of a multispar lifting surface according to a first embodiment of the invention.

FIG. 3A depicts a multispar lifting surface (30) according to the invention, and comprising a multispar torsion box (32), a movable control surface—as already defined but installed in a multi-cell structure-, and an axial rod fitting (40).

The multispar torsion box (32) structure is of composite material and comprises the following structural elements:
upper surface (3),
lower surface (4),
several spars, among them a rear spar (5),
an open cell (21), open towards the rear end of the torsion box (32), and formed by a portion of the upper surface (3), a portion of the lower surface (24), and the rear spar (5), and
a closed cell (22), adjacent to the open cell (21), and formed by the upper surface (23), the lower surface (24), the rear spar (5) and a further spar (51) adjacent to the rear spar (5).

Figure 3B:
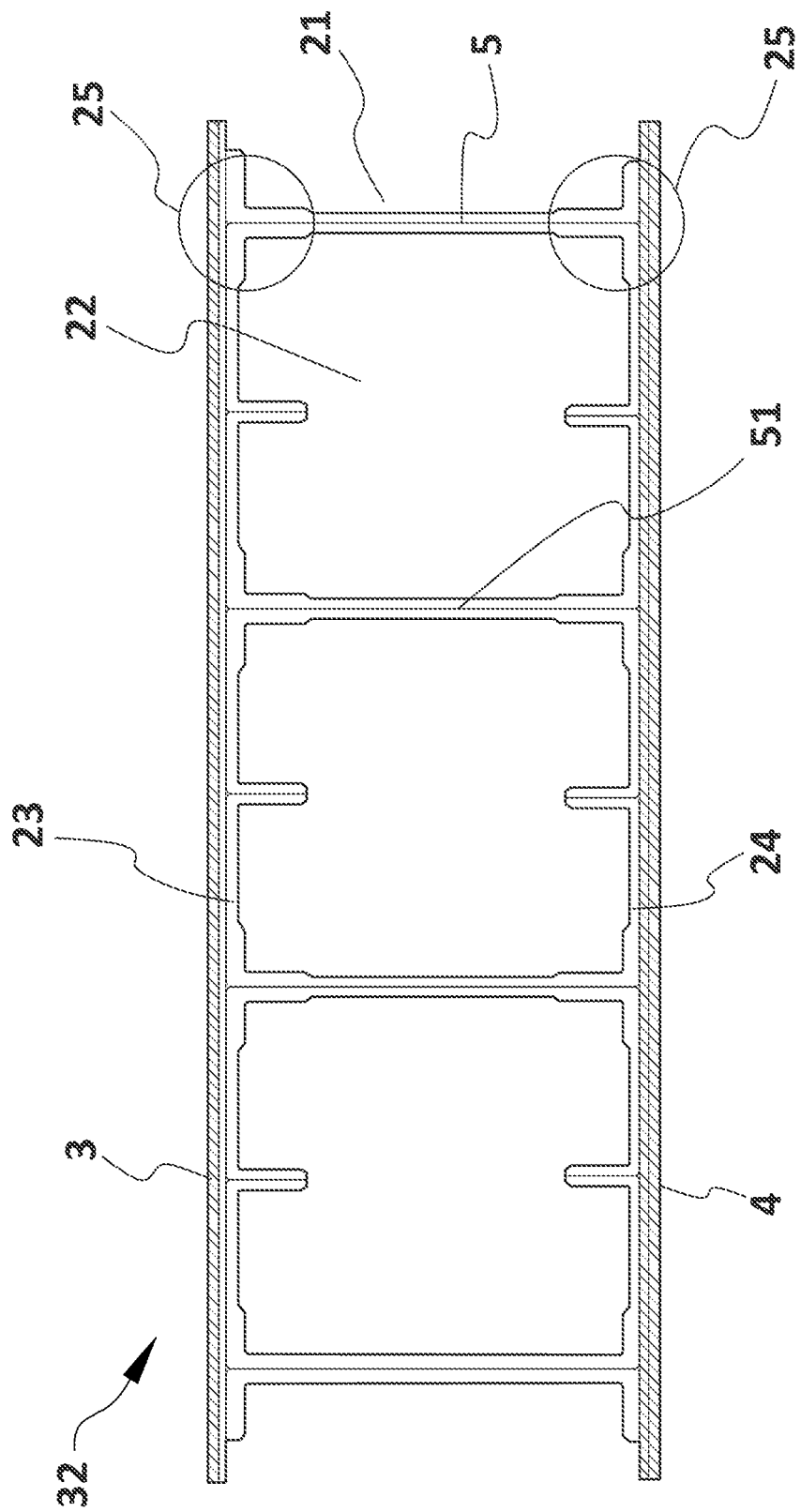
FIG. 3B shows a detailed view of the multispar torsion box of the multispar lifting surface.

Also, as shown in FIG. 3B, and according to the invention, the multispar torsion box (32) further comprises corner reinforcements (25) formed by an increased thickness, at least in:
the corners of the open cell (21) formed by the upper and lower surfaces (23, 24) and the rear spar (5), and
the corners of the closed cell (22) formed by the upper and lower surfaces (23, 24) and the rear spar (5).

These reinforced corners act as hard points, making it unnecessary to install any contra fitting.

The movable control surface of the invention also comprises a movable element (1), a hinge element (6), and an axial rod (7). With respect to the hinge element (6), the second end of the upper and lower arms (6.2, 6.3) are now located in the corners of the open cell (21) since a multi-cell structure has been used as torsion box, but the elements and their locations are the same as the ones of the state of the art.

As seen in FIG. 3A, the hinge element (6) of the movable control surface preferably defines a plane comprising the upper and the lower arms (6.2, 6.3) approximately perpendicular to the longitudinal direction of the rear spar (5).

Figure 4:
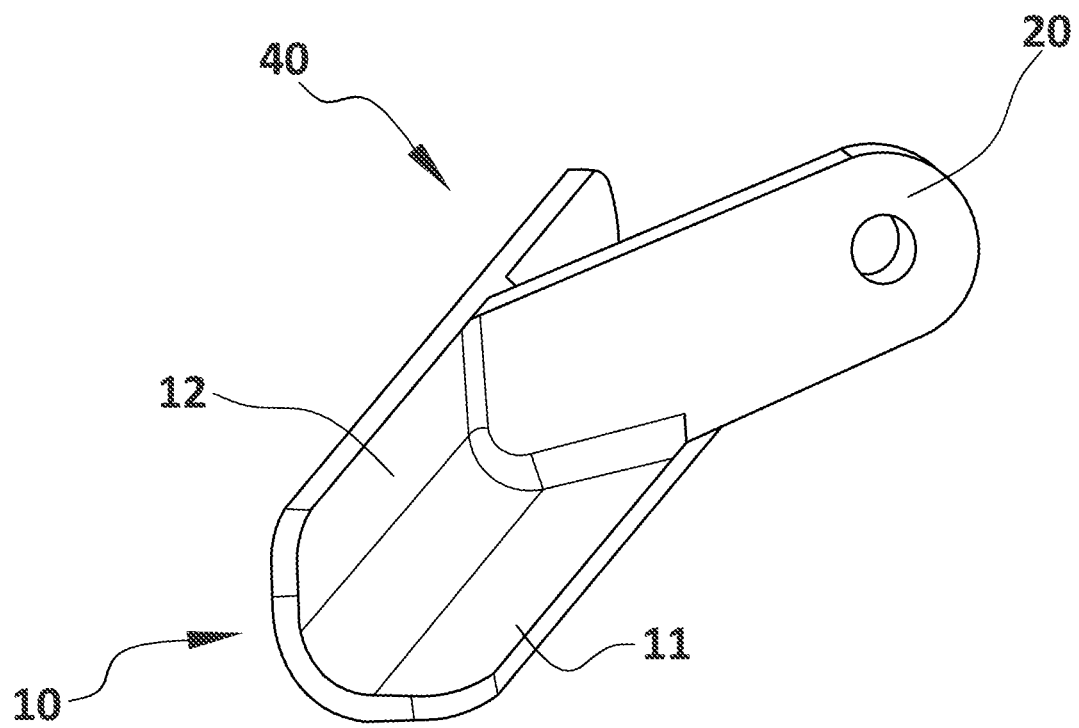
FIG. 4 shows a perspective view of a first embodiment of the axial rod fitting of the multispar lifting surface of the invention.
Figure 5:
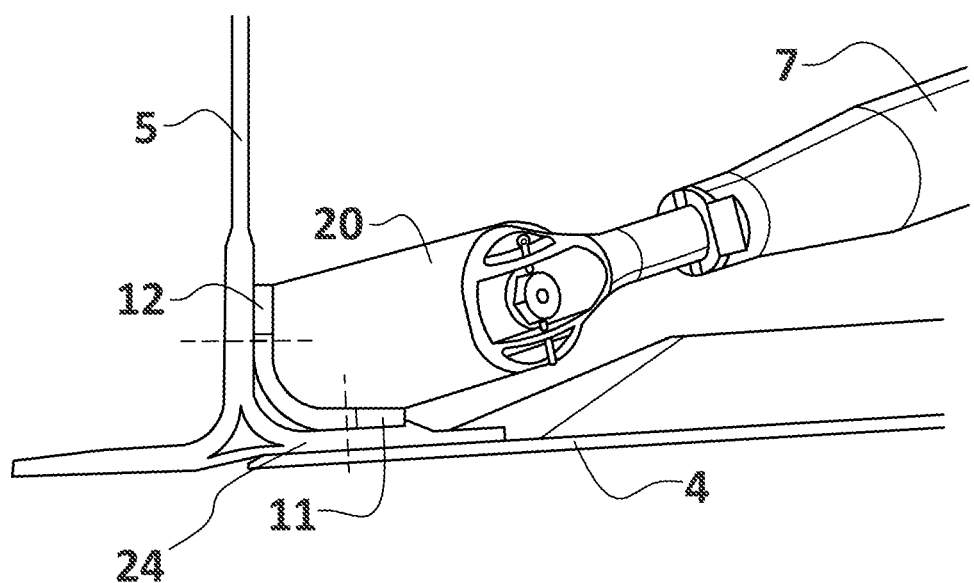
FIG. 5 shows a front view of the rear spar, the lower cover and the axial rod fitting according to the first embodiment of the axial rod fitting shown in FIG. 4.
Figure 7:
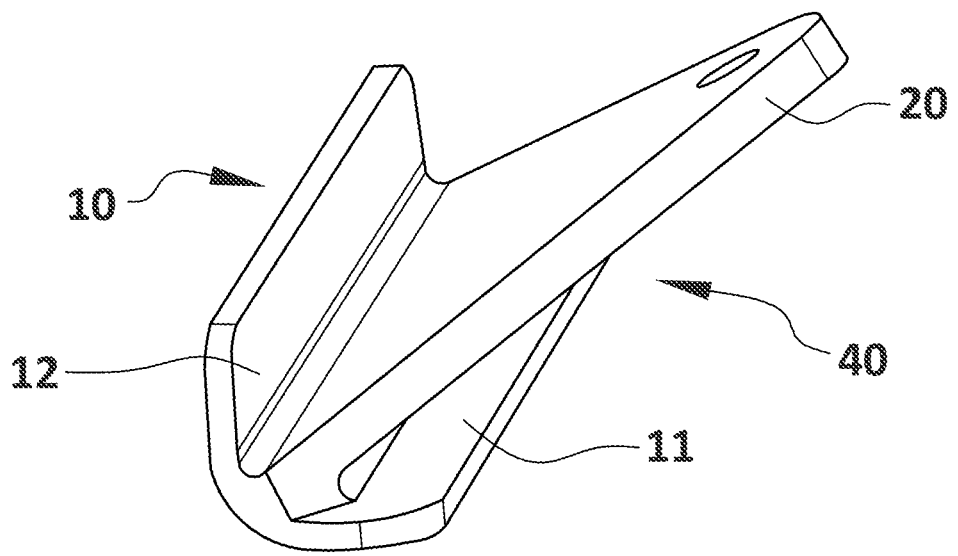
FIG. 7 shows a perspective view of a second embodiment of the axial rod fitting of the multispar lifting surface of the invention.

FIGS. 4 and 7 discloses two embodiments of the axial rod fitting (40) of the invention.

The axial rod fitting (40) comprises:
a longitudinal profile (10) comprising a L-shaped cross-section. The longitudinal profile (10) comprises two wings (11, 12). One of the wings (11) is configured to rest against a portion of one of the surfaces (23, 24) of the open cell (21) of the multispar torsion box (32). The other wing (12) is configured to rest against a portion of the rear spar (5) of the open cell (21) of the multispar torsion box (32). Thus, the longitudinal profile (10) is configured to be located at the rear spar (5) and the surfaces (23, 24) corners. The longitudinal profile (10) is configured to be located with its longitudinal axis parallel to the longitudinal axis of the rear spar (5);

a lug (20) joined to the longitudinal profile (10) at one end and comprising means for being joined to the axial rod (7) at its other end. The lug (20) comprises a plane configured to comprise the longitudinal axis of the axial rod (7) in its mounted position. In the shown embodiments, the lug (20) is planar and comprises an orifice for connection with the axial rod (7).

The axial rod (7) is located diagonally with respect to the rear spar (5) and, as stated, the axial rod fitting (40) will be located at the open cell (21) corner between the rear spar (5) and the surfaces (23, 24). Thus, the longitudinal axis of the axial rod (7) forms approximately 45° with the longitudinal direction of the plane of the wing (12) configured to be located against the rear spar (5).

The axial rod fitting (40) may be located at the corner of the lower surface (24) and the rear spar (5), or at the corner of the upper surface (23) and the rear spar (5).

As shown in FIG. 3A, if located at the lower corner, the axial rod (7) forms an angle of between 60° and 70° with the longitudinal direction of the plane of the wing (12) configured to be located against the rear spar (5).

The lug (20) comprises a plane that intersects the wings (11, 12) of the longitudinal profile (10). In the embodiment shown in FIGS. 4 to 7, the intersection of the plane of the lug (20) with one of the wings (11, 12) forms a square angle with the longitudinal direction of the longitudinal profile (10).

The above configuration allows enough space to install the axial rod fitting (40) directly to the structure with solid or hi-lok rivets, and enough space to use a standard axial rod (7) and join it with same fasteners as in the state of the art.

More specifically, the wing (12) comprising the intersection forming a square angle with the longitudinal direction of the longitudinal profile (10) is the wing (12) configured to rest against the rear spar (5).

Figure 6:
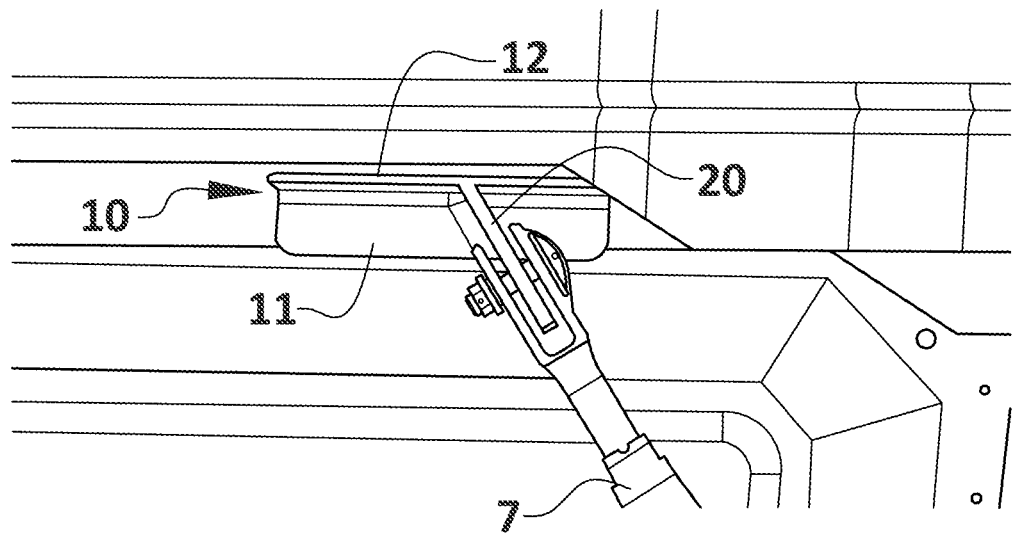
FIG. 6 shows a lateral view of the first embodiment of the axial rod fitting shown in FIGS. 4 and 5, located in a built-in position.

FIG. 6 shows the plane of the lug (20) and the plane of the wing (12) resting on the rear spar (5) at 45°.

Figure 8:
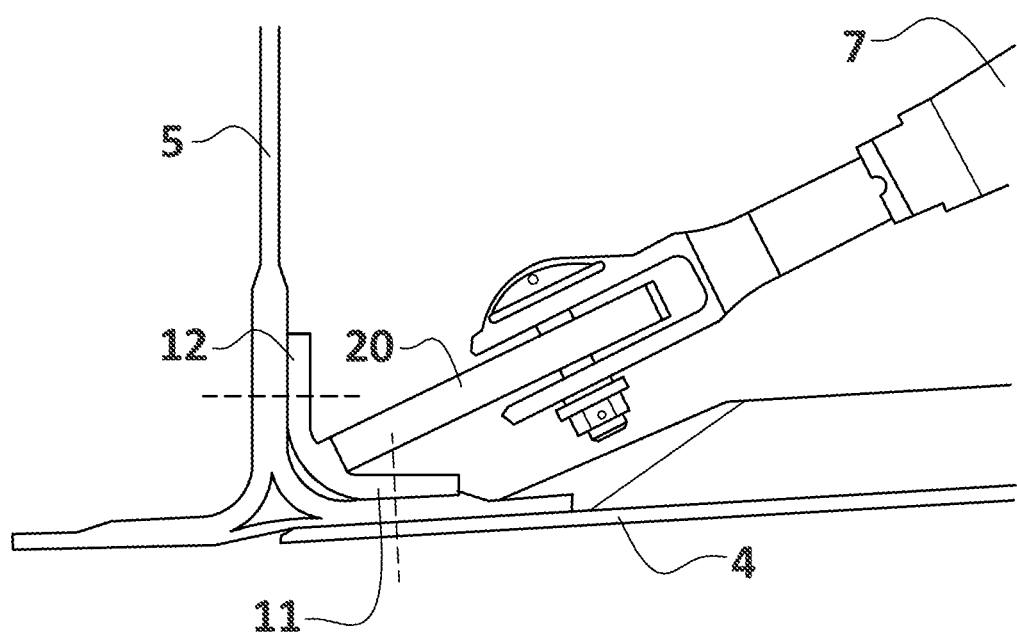
FIG. 8 shows a front view of the rear spar, the lower cover, and the axial rod fitting according to the second embodiment of the axial rod fitting shown in FIG. 7.
Figure 9:
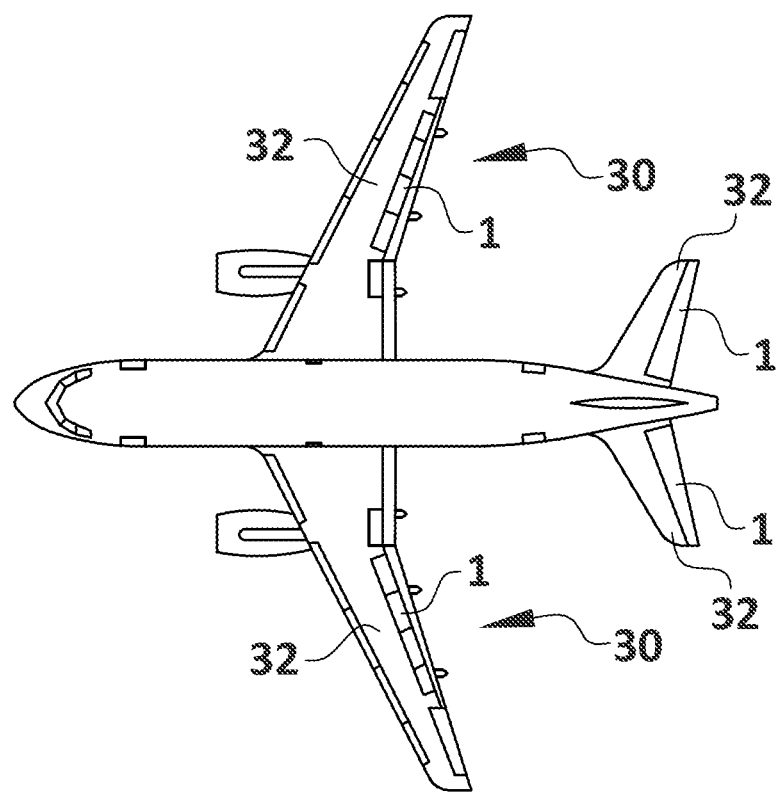
FIG. 9 shows a plan view of an aircraft having a multispar lifting surface according to the invention.

FIGS. 7 and 8 disclose a second embodiment wherein the lug (20) comprises a plane that intersects the L-shaped profile along the portion of the longitudinal profile (10) between the two wings (11, 12).

In the embodiment shown in these FIGS. 7-8, the plane of the lug (20) forms 60° with the plane of the wing (12) configured to rest against the rear spar (5).

This solution has a better load distribution, especially constant dispensation along the lower surface (4) and the rear spar (5) corner, but it needs more space for axial rod (7) installation.

In the shown embodiments, the lug (20) is configured to be joined to the lower surface (24) of the multispar torsion box (32).

In case of elevator and HTP, the lower position of the axial rod fitting (40) in the corner between the lower surface (24) and the rear spar (5) is divided by the axial rod (7) in a ratio more or less 30° to 60° as shown in FIG. 3A.

The axial rod fitting (40) could also be joined to the upper surface (23), i.e., to be located in the upper corner of the rear spar (5). For HTP case, because of the typical difference between the distance from elevator hinge line to upper and lower surfaces (23, 24), the distance to upper surface (23) is shorter and a small angle complicates the installation and makes less efficient load transfer.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A multispar lifting surface, comprising:
a multispar torsion box made of composite material, and comprising upper and lower surfaces and a plurality of spars between said surfaces forming a multi-cell structure, the plurality of spars including a rear spar defining:
an open cell open towards a rear end of the torsion box, and formed by a portion of the upper surface, a portion of the lower surface, and the rear spar, and
a closed cell, adjacent to the open cell, and formed by the upper surface, the lower surface, the rear spar and a further spar adjacent to the rear spar,
a movable control surface comprising:
a movable element,
a hinge element comprising a hinged connection joined to the movable element, and an upper and a lower arm, both arms comprising a first end located in the hinged connection and a second end located in the rear spar along to a transverse direction of the rear spar, the second end of the upper arm located in a corner of the open cell formed by the upper surface and the rear spar, and the second end of the lower arm located in a corner of the open cell formed by the lower surface and the rear spar,
an axial rod comprising a first end located in the hinged connection and a second end located in the rear spar, longitudinally distant from the second ends of the upper and lower arms,
wherein the multispar torsion box further comprises:
corner reinforcements formed by an increased thickness, at least in:

corners of the open cell formed by the upper and lower surfaces and the rear spar, and corners of the closed cell formed by the upper and lower surfaces and the rear spar, and wherein the multispar lifting surface further comprises:

an axial rod fitting configured to join the axial rod and the multispar torsion box, the axial rod fitting comprising:

a longitudinal profile comprising a L-shaped cross-section, the longitudinal profile comprising two wings, a first one of the wings resting against a portion of one of the surfaces of the open cell and a second one of the wings resting against a portion of the rear spar of the open cell, such that the longitudinal profile is located along a longitudinal direction of the rear spar at a corner with one of the surfaces, and a lug joined to the longitudinal profile at one end and to the axial rod at another end, the lug defining a plane comprising a longitudinal axis of the axial rod.

2. The multispar lifting surface, according to claim 1, wherein the axial rod fitting is located at a corner of the lower surface and the rear spar or at a corner of the upper surface and the rear spar of the open cell.

3. The multispar lifting surface, according to claim 2, wherein the longitudinal axis of the axial rod forms an angle of between 60° and 70° with a transverse direction of the plane of the second wing located against the rear spar.

4. The multispar lifting surface, according to claim 1, wherein the longitudinal axis of the axial rod forms approximately an angle of 45° with the longitudinal direction of a plane of the second wing located against the rear spar.

5. The multispar lifting surface, according to claim 1, wherein the lug comprises a plane that intersects the wings of the longitudinal profile.

6. The multispar lifting surface, according to claim 5, wherein an intersection of a plane of the lug with one of the wings forms a square angle with the longitudinal direction of the longitudinal profile.

7. The multispar lifting surface, according to claim 6, wherein the wing comprising the intersection forming a square angle with the longitudinal direction of the longitudinal profile is the second wing that rests against the rear spar.

8. The multispar lifting surface, according to claim 5, wherein the lug comprises a plane that intersects the longitudinal profile along the portion of the longitudinal profile between the two wings.

9. The multispar lifting surface, according to claim 1, wherein the hinge element further comprises a rear arm connected to the first arm and to the second arm and resting against the rear spar.

10. An aircraft comprising a multispar lifting structure according to claim 9.

* * * * *